Patented Oct. 8, 1940

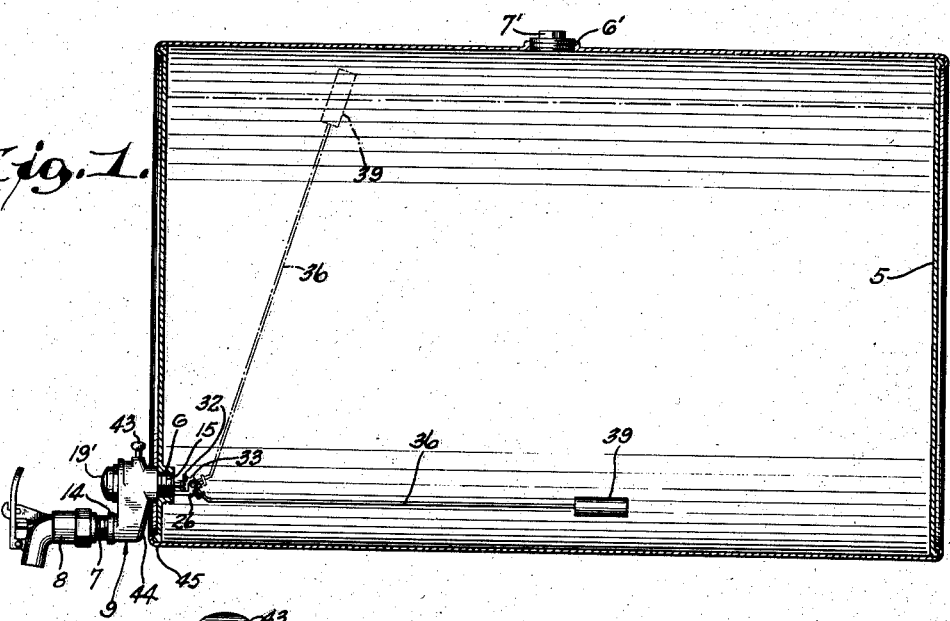

2,216,917

UNITED STATES PATENT OFFICE 2,216,917

GAUGE AND OUTLET FITTING FOR DRUMS

Carl E. Klumb, West Bend, and Roy H. Hecker, Milwaukee, Wis.

Application April 3, 1939, Serial No. 265,642

5 Claims. (Cl. 73—317)

This invention relates to improvements in gauge and outlet fittings for drums.

In industry it is common to order liquids, such as industrial solvents, in 50 gallon drums and these drums are returned as empties when a new filled one is delivered. During use, the liquid is dispensed directly from the drums through faucets which have been screwed into an opening provided therefor. Heretofore, there has been no way of ascertaining the amount of liquid in a drum of this type because there is no opening provided for the reception of a gauge, and it would not be practical for a user to make a special gauge installation in a drum which must be returned when empty.

It is therefore a principal object of the invention to provide an improved fitting insertable in the faucet opening of a standard drum which fitting provides for the use of both a gauge and a faucet, or other outlet, cooperable with said single drum opening.

A further object of the invention is to provide a structure as above described which permits the quick insertion of a gauge and outlet connection in a standard drum while said drum is filled with liquid without necessitating alteration of said drum, and which further permits quick removal of the gauge and outlet fitting from an empty drum before said drum is returned.

A further object of the invention is to provide a fitting particularly adapted for use in conjunction with a float type of gauge wherein the float is carried on the end of a swinging arm, there being novel means on said fitting for maintaining said arm in a stationary position to permit insertion of the gauge in a filled drum, whereby the float will not be acted upon by the fluid to hinder or prevent such insertion.

Other objects of the invention are to provide a gauge and outlet fitting which is simple and inexpensive in construction, which is a convenience to users of liquid drums, and which is otherwise well adapted for the purpose described.

With the above and other objects in view, the invention consists of the improved gauge and outlet fitting for drums and all its parts and combinations as set forth in the claims and all equivalents thereof.

In the accompanying drawing illustrating one complete embodiment of the preferred form of the invention, in which the same reference numerals designate the same parts in all of the views:

Fig. 1 is a view showing the improved gauge and outlet fitting connected to the standard opening of a drum, the drum being shown in longitudinal section and the dot and dash lines indicating the position of the float when the drum is filled;

Fig. 2 is a view on an enlarged scale of the gauge and outlet unit, parts being shown in section and the gauge arm being broken away;

Fig. 3 is a sectional view taken on line 3—3 of Fig. 2; and

Fig. 4 is a plan view of the gauge removed from the fitting, parts being broken away.

Referring more particularly to the drawing, the numeral 5 designates a drum which may be a standard article of 50 gallon capacity formed of metal. One end of the drum may be formed with a threaded opening 6 which in standard practice is provided for the insertion of a faucet. Another portion of the drum may be provided with a filling opening 6' closed by a threaded plug 7'.

It is common practice to screw the stem 7 of a faucet similar to the faucet 8 directly into the threaded opening 6 of the drum for dispensing the liquid from the drum. With such an arrangement the amount of liquid remaining in the drum at any time cannot be determined and it is a great inconvenience to users in that the liquid may be found to be exhausted at some time when it is most needed and when no new drum is on hand to take care of the requirement.

The present invention includes the use of a fitting 9 having its upper end formed with a bore 10 which extends transversely therethrough and which bore is threaded as at 11 and 12. Communicating with the lower portion of the bore 10 and within the fitting is a downwardly extending passageway 13 which communicates with a laterally extending interiorly threaded outlet connection 14. The outlet connection 14 is of a size to receive the threaded stem portion 7 of a standard dispensing faucet 8, or in lieu of the dispensing faucet an outlet pipe line may be connected to the opening 14 to convey the liquid to a remote point of use.

Threaded into the inner threaded end portion 11 of the transverse bore 10 is an exteriorly threaded extension 15, which extension is of a size to cooperate with the threaded opening 6 of a standard drum to connect the fitting to said drum. The threaded extension 15 may of course be an integral part of the fitting 9 if desired.

The gauge which it is contemplated to employ in connection with the fitting includes a dial 16 having the usual quantity designations thereon, and said dial has a pin 17 projecting outwardly therefrom for supporting an indicator needle 18, which needle is of magnetic material and freely rotatable on the pin. The dial is carried by the outer end of a supporting member 19 which supporting member has a threaded portion 20 insertable in the threaded outer end portion 12 of the bore 10. A window of glass or other suitable material 19' may cover the dial and needle. Projecting inwardly from the lower part of the threaded extension 20 of the dial support 19 is an elongated bracket 21 which is substantially U-shaped in cross-section. The bracket 21 has a bottom opening 22 therein, with the material from said opening bent upwardly as at 23 and apertured as at 24, to provide a bearing. The upper end opening 25 of the fitting passageway 13 is positioned to be in registration with the opening 22 of the gauge bracket 21, whereby liquid entering the extension 15 of the fitting may flow freely through the openings 22 and 25 into the passageway 13 without interference from the gauge actuating mechanism.

The extreme inner end of the gauge bracket 21 is formed with upstanding laterally spaced ears 26 having apertures 27 therein, and outwardly of said ears is an upwardly bent bearing extension 28 having an opening 29 therein. A rotatable shaft 30 is journaled through the openings 24 and 29 of the bearing members 23 and 28 and the outer end of said shaft carries a permanent magnet 31 which is rotatable with the shaft 30 directly behind the dial 16. Rotation of the magnet causes the metal needle on the other side of the dial to rotate in accordance with the movement of the magnet 31.

On the extreme inner end of the shaft 30, there is a segmental pinion 32 which is in mesh with a rack member 33. The rack member 33 forms part of a U-shaped member 34 which can oscillate in a vertical plane on the short shaft 35 which extends through the openings 27 in the ears 26. The shaft 35 may be formed by a bent portion of the inner end of the float arm 36, said inner end also cooperating as at 37 with an extension 38 of the member 34 carrying the rack 33. Thus the rack 33 and float arm 36 are united for movement together. The extreme end of the float arm 36 carries a suitable float 39.

The upper end portion of the fitting 9 is provided with an interiorly threaded recess 40 for reception of a plug 41, which retains a liquid packing 42 in position in the bottom of the recess. A screw 43 is threaded through the plug 41 and through the wall of the fitting 9, with its lower end engageable with an intermediate portion of the gauge shaft 30. By turning the set screw 43 down into a position of firm engagement with the shaft 30, said shaft will be frictionally retained against rotation and as a result, swinging movement of the float arm 36 is prevented. Thus the float arm may be positively maintained in the straight position shown by full lines in Fig. 1, while the fitting and connected devices are being screwed into a filled drum. By thus retaining the float arm against swinging movement during insertion, the float will not be acted upon by the buoyant fluid. Without this mechanism, it would be impossible for the unit to be inserted in a filled drum without doing permanent damage to the float arm because the latter would immediately move to the dot and dash line position of Fig. 1, and as the unit was rotated while being inserted in the opening 6, the freely swinging arm would be jammed against wall portions of the drum and permanently bent or otherwise damaged.

In use of the device, it is apparent that when a filled drum is received at an industrial plant, that the gauge and outlet unit may be quickly inserted in the opening 6 of the filled drum while the set screw 43 is locking the float arm against movement and while the drum is standing on end. The drum is then placed in dispensing position of Fig. 1 and the set screw is loosened to permit the gauge mechanism to function. Upon loosening the set screw 43, the float will immediately assume the dot and dash line position of Fig. 1 and a filled condition will be indicated on the gauge. Various intermediately filled conditions will be likewise indicated due to the fact that movement of the swinging float arm 36 transmits rotating movement to the shaft 30 and magnet 31 through the rack 33 and segmental pinion 32 and, of course, the dial indicating needle will follow the magnet 31.

Due to the peculiar construction of the fitting 9, the single drum opening 6 is adapted for cooperation with both the gauge and outlet connection. The opening 25 in the fitting, which connects with the outlet passageway 13, is so positioned as to be in registration with the opening 22 of the gauge bracket whereby the gauge in no way interferes with the discharge of liquid through the fitting and through the faucet 8 or other outlet connection.

When the drum is empty, the fitting and gauge can be quickly removed and replaced in a filled drum and the empty drum can be returned to the drum owner. The inner side of the depending portion of the fitting 9 is preferably angled as at 44 to clear the bead 45 on the end of the drum.

Although only one form of the invention has been shown and described, it is obvious that various changes and modifications may be made without departing from the spirit of the invention and all of such changes are contemplated as may come within the scope of the claims.

What we claim is:

1. A gauge and outlet unit comprising a fitting having a common gauge and discharge bore extending therethrough, means at the inner end of said bore for threaded cooperation with the faucet opening of a liquid drum to provide for connection of said fitting to a drum with the axis of the gauge bore in alinement with the axis of the drum opening, a liquid level indicator connected to said fitting at the outer end of said bore, a rotatable indicator operating shaft extending through said bore, a float arm swingably carried by said fitting at the inner end of said bore so as to be alineable with said bore, means between said float arm and rotatable shaft for positively transmitting movement to the latter whenever the float is moved, and exteriorly accessible means on the fitting engageable with said rotatable shaft for preventing rotation of said shaft and swinging movement of the float arm and for positively holding the latter in stationary position alined with the fitting bore when the fitting is being threaded into the faucet opening of a filled drum.

2. A gauge and outlet unit comprising a fitting having a common gauge and discharge bore extending therethrough, means at the inner end of said bore for threaded cooperation with the faucet opening of a liquid drum to provide for connection of said fitting to a drum with the axis of the gauge bore in alinement with the axis of the drum opening, a liquid level indicator connected to said fitting at the outer end of said bore, a rotatable indicator operating shaft extending through said bore, a float arm swingably carried by said fitting at the inner end of said bore so as to be alineable with said bore, means between said float arm and rotatable shaft for positively transmitting movement to the latter whenever the float is moved, and an exteriorly accessible screw threaded into the fitting and having its lower end engageable with said rotatable shaft for preventing rotation of said shaft and swinging movement of the float arm and for positively holding the latter in stationary position alined with the fitting bore when the fitting is being threaded into the faucet opening of a filled drum.

3. A fitting comprising a member having a bore extending therethrough within the outer end of which a liquid level gauge having a float arm is removably inserted to have its float arm projecting from the inner end of said bore, and means at the inner end of said bore for threaded connection with the opening of a drum to position the float arm within the drum, said fitting having a liquid discharge passageway communicating with an intermediate portion of said bore whereby a single drum opening may serve for both a gauge connection opening and a discharge opening, and exteriorly accessible means on said fitting extending into the gauge bore for positively holding the gauge float arm stationary and in alinement with the bore while the fitting is being threaded into the opening of a filled drum.

4. A gauge and outlet unit comprising a fitting having a gauge bore extending therethrough, screw threads on the inner end of said fitting surrounding the bore and cooperable with the threaded discharge opening of a liquid drum to connect the fitting to a drum with the axis of the gauge bore in alinement with the axis of the drum opening, a liquid level indicator connected to said fitting at the outer end of said bore, a rotatable indicator operating shaft extending through said bore, a float arm pivoted to the fitting at the inner end of the bore and adapted to extend into a drum opening, and gearing between the float arm and rotatable shaft for positively transmitting movement to the latter whenever the float is moved, the operating pivot for the float arm extending transversely of the gauge bore, whereby the float arm may be axially alined while in an operable position with the discharge opening of a drum to permit quick removal of the fitting from an empty drum and quick insertion of the fitting into a filled drum, said fitting having a liquid discharge passageway communicating with an intermediate portion of said gauge bore.

5. In combination, a portable liquid drum having a threaded discharge opening in an end thereof, a fitting having a gauge bore extending therethrough, screw threads on the inner end of said fitting surrounding the bore and cooperable with the threaded discharge opening of the drum to connect the fitting to the drum with the axis of the gauge bore in alinement with the axis of the drum opening, a liquid level indicator connected to said fitting at the outer end of said bore, a rotatable indicator operating shaft extending through said bore, a float arm pivoted to the fitting at the inner end of the bore and extending into the drum, and gearing between the float arm and rotatable shaft for positively transmitting movement to the latter whenever the float is moved, the operating pivot for the float arm extending transversely of the gauge bore, whereby the float arm may be axially alined in a position of operating movement with the discharge opening of the drum to permit quick removal of the fitting from the drum when empty and quick insertion of said fitting into a new filled drum, said fitting having a liquid discharge passageway communicating with an intermediate portion of said gauge bore.

CARL E. KLUMB.
ROY H. HECKER.